United States Patent [19]
Gupta

[11] 4,403,333
[45] Sep. 6, 1983

[54] METHOD FOR RECOGNIZING DIGITAL INFORMATION IN TRANSMISSION IN MOBILE RADIO COMMUNICATIONS SYSTEMS

[75] Inventor: Probodh D. Gupta, Germering, Fed. Rep. of Germany

[73] Assignee: Siemens Aktiengesellschaft, Berlin & Munich, Fed. Rep. of Germany

[21] Appl. No.: 296,972

[22] Filed: Aug. 27, 1981

[30] Foreign Application Priority Data

Sep. 29, 1980 [DE] Fed. Rep. of Germany ....... 3036655

[51] Int. Cl.$^3$ .............................................. H04L 1/22
[52] U.S. Cl. ......................................... 375/94; 371/36
[58] Field of Search ...................... 370/93; 340/825.62, 340/825.64; 375/94, 95; 371/31, 36, 43, 44, 45, 67, 68, 69

[56] References Cited

U.S. PATENT DOCUMENTS 3,863,215  1/1975  McGrogan, Jr. ..................... 371/36
4,338,629  7/1982  Oprandis et al. ..................... 371/36

FOREIGN PATENT DOCUMENTS 1804719  5/1970  Fed. Rep. of Germany .

*Primary Examiner*—Benedict V. Safourek
*Attorney, Agent, or Firm*—Hill, Van Santen, Steadman & Simpson

[57] ABSTRACT

In a method for recognizing digital information, particularly in an information transmission in a mobile radio communications system, in which a sampling pulse is derived from the digital information available at the receiver, preferably from a whole multiple of the information clock frequency, and in which a sampling time is placed into the respective area of an information element in which the pulse to be sampled which represents the information element assumes its suspected, quasi-stationary state, at least one further, non-correlated sampling pulse is drived from the received information, the further pulse having a further whole multiple of the information clock frequency. The edges of the further sampling pulse are placed at a corresponding number of sampling times within a further extended sampling range of the pulse representing the information element. A respective comparison of the sampling results is carried out for an information element and a majority decision is undertaken on the basis of existing sampling results. The first sampling result and all signals obtained from the various majority decisions are subjected, variously weighted, to a further majority decision to obtain a signal which is supplied to an information sink.

2 Claims, 2 Drawing Figures

METHOD FOR RECOGNIZING DIGITAL INFORMATION IN TRANSMISSION IN MOBILE RADIO COMMUNICATIONS SYSTEMS

CROSS REFERENCE TO RELATED APPLICATIONS

This application is related to my co-pending applications Ser. No. 296,821 and Ser. No. 296,867, both filed on Aug. 27, 1981.

BACKGROUND OF THE INVENTION

1. Field of the Invention

The present invention relates to a method for recognizing digital information in a digital information transmission, particularly an information transmission in mobile radio communications systems, and to a circuit arrangement for implementing the method.

2. Description of the Prior Art

Speech, data and images are forms of information which are to be transmitted in known, wire-bound communications systems and in future mobile radio communications systems. Given a transmission of information, particularly digitized information, in a mobile radio communications system, a problem arises in that, due to so-called multi-path propagation on the radio path, fading arises which can cause information bit errors during transmission.

Methods are known by which a sampling pulse is derived at the respective receiver from the digital information received, the sampling pulse being employed for placing a sampling time into the respective area of an information element in which the pulse to be sampled and which represents the information element assumes its suspected quasi-stationary state, cf. for example, the German allowed and published application No. 1,804,719. These known methods, however, have the disadvantage that, in those cases in which pulses representing information elements are distorted in amplitude and/or in phase due to disruptive influences, a bit error can be simulated precisely in the respective area sampled, although the appertaining pulse, when viewed as a whole, can be free of error.

In previous mobile radio communications systems, as favorable as possible a bit error rate is sought by applying different encoding methods, for example, "forward error correcting". This philosophy, however, is opposed by the desire to achieve a standardization of the operating modes.

SUMMARY OF THE INVENTION

The object of the present invention is to provide a method and apparatus for recognizing digital information in a digital information transmission of the type mentioned above, by means of which favorable bit error rates can be achieved without having to accept one of the aforementioned disadvantages.

The above object is achieved, according to the present invention, particularly in information transmission in mobile radio communications systems, in which a sampling pulse from the digital information available at the receiver is preferably derived with a whole multiple of the information clock frequency and in which a sampling time is placed into the respective area of an information element in which the pulse to be sampled and representing this information assumes a suspected, quasi-stationary state which is characterized in that at least one further, non-correlated sampling pulse is derived from the digital information available at the receiver, the further sampling pulse exhibiting a further, whole multiple of the information clock frequency. Further, the edges of the sampling pulse are placed at a corresponding number of sampling times within a further extended sampling area of the pulse representing the information element. A respective comparison of a first sampling result with one or more following sampling results is carried out for an individual information element. A majority decision is made on the basis of the existing sampling results and all signals obtained from the various majority decisions are subjected, variously weighted, to a further majority decision. The signal finally obtained is supplied to an information sink.

The present invention offers the advantage that a multiple sampling of the information elements can be executed in a simple manner and that pulses which are error-free overall per se, but which represent distorted information elements, can be accepted as error-free, so that the information transmission experiences a higher utilization effect.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 2:
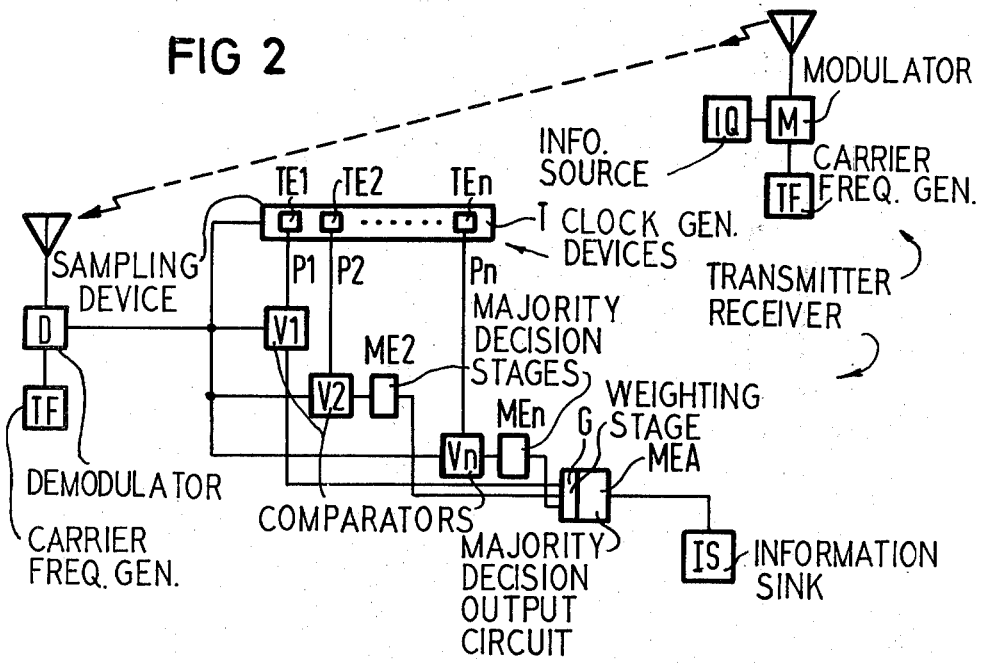
FIG. 2 is a block diagram illustration of a preferred exemplary embodiment of a circuit arrangement for implementing the method of the present invention.

Provided in the receiver for the implementation of the method are a demodulator D, a carrier frequency generator TF, a plurality of non-correlated clock generating devices TE1, TE2–TEn, a plurality of comparators V1, V2–Vn, a plurality of majority decision stages ME2–MEn, a majority decision output circuit MEA for obtaining the informational content and including a weighting stage G, and an information sink IS. The transmitter is illustrated as comprising devices which are well known per se and which are illustrated only for an understanding of the inter-relationships herein and may include, for example, an information source IQ, a carrier frequency generator TF and a modulator M, all of the above being illustrated in FIG. 2.

Figure 1:
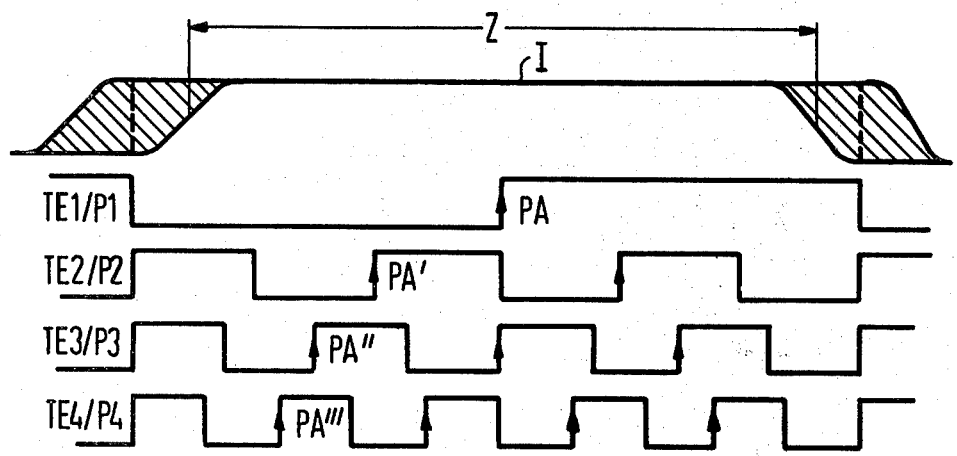
FIG. 1 is a graphic illustration of an information pulse having various sampling pulses.

According to the invention, for an optimum sampling of a pulse representing an information element, cf. FIG. 1, it is provided that, in addition to the sampling pulse which is derived from the incoming digital information and which is generated in a first clock generating device TE1, further non-correlated sampling pulses having a respective frequency which is higher in comparison to the frequency of the first clock generating device TE1 are generated by further clock generating devices TE2–TEn. Various sampling modes for sampling the pulse representing the information element can be employed with the various sampling pulses made available.

It proceeds from FIG. 1 that the pulse I representing the information element can be sampled in sampling areas having various widths by means of the various sampling pulses P1, P2–Pn. To this end, a comparison of a first sampling result to one or more following sampling results is respectively carried out for an individual information element.

To this end, individual comparators V1, V2–Vn are respectively assigned to each of the clock generating devices contained in a sampling device T, the comparators connected to the individual clock generating devices TE1, TE2–TEn. With the assistance of these comparators, the sampling results which derive from a single sampling or, respectively, from a respective multiple sampling of a single, individual information element, are compared to one another. Individual majority decision stages ME2–MEn are respectively connected to the comparators V2–Vn, the majority decision stages selecting that sampling result as the "correct" sampling result in a manner known per se, for example, by means of a so-called majority logic, which predominantly occurred in the multitude of the individual sampling results for a single information element. For that instance in which no majority occurs, the signal output of the appertaining majority decision stage is made high-resistant, for example, or, respectively, inactive, for example by means of a tristate logic device.

All sampling results determined in this manner from the individual majority decision stages ME2–MEn or, respectively, from the first comparator V1, are supplied—variously weighted, in particular by the weighting stage G—to the majority decision output circuit MEA, which supplies the final information signal to the information sink IS.

Although I have described my invention by reference to a particular illustrative embodiment, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for recognizing digital information of a digital information element in a clocked digital information transmission, comprising the steps of:
    first, sampling the information element at a first multiple of the information clock frequency to derive a first sampling result representing the content of the information element at a time in which the information element is assumed to be in its quasi-stationary state;
    then, sampling the information element at least one more time at a respective different multiple of the information clock frequency within the assumed quasi-stationary state of the information element to obtain a respective additional sampling result;
    conducting a first majority decision for each of the additional sampling results;
    weighting the first sampling result and the majority decision results; and
    conducting a second majority decision for the weighted results to obtain a signal representative of the content of the sampled information element.

2. Apparatus for recognizing digital information of a digital information element in a clocked digital information transmission modulated on a carrier, comprising:
    an antenna for receiving the information transmission;
    a carrier frequency generator;
    a demodulator connected to said antenna and to said carrier frequency generator for demodulating the digital information;
    a sampling device connected to said demodulator and operable to produce first and additional pulses corresponding to at least first and second multiples of the information clock frequency and;
    a plurality of evaluation circuits connected to said demodulator and to said sampling device for evaluating the information element with the respective sample pulses;
    at least one first majority decision stage connected to each of said evaluation circuits except that comparator which receives the first sample pulse and operable to perform a majority decision for each; and
    a second majority decision stage connected to said comparator for the first sample pulse and to each first majority decision stage, including weighting means for weighting each signal it receives, for providing a majority decision output signal representing the content of the sampled information element.

* * * * *